United States Patent [19]

Bibollet

[11] Patent Number: 4,768,794
[45] Date of Patent: Sep. 6, 1988

[54] STEERING SYSTEM FOR VEHICLE SUCH AS SNOWMOBILE

[75] Inventor: Jean-Claude Bibollet, Thones, France

[73] Assignee: Bibollet S.A., Bons en Chablais, France

[21] Appl. No.: 49,946

[22] Filed: May 15, 1987

[30] Foreign Application Priority Data

May 29, 1986 [FR] France ............................. 86 08001

[51] Int. Cl.⁴ ...................... B62B 17/00; B62M 27/02
[52] U.S. Cl. ................................... 280/21 R; 180/190
[58] Field of Search .................. 280/272, 21 R, 21 A, 280/16, 89; 180/190, 191, 192, 193, 194, 195

[56] References Cited

U.S. PATENT DOCUMENTS 627,314 6/1899 Veon .................................. 280/272
2,063,920 12/1936 Friestedt .............................. 280/89
2,388,145 10/1945 Heagney ....................... 280/21 R X
3,825,086 7/1974 Bombardier ..................... 280/21 R Primary Examiner—John A. Pekar
Attorney, Agent, or Firm—Sandler & Greenblum

[57] ABSTRACT

A steering assembly for a vehicle having a rear carrier assembly that includes ground engaging means, a front steering assembly that includes ground engaging means, and mounting means mounting the front steering assembly on the rear carrier assembly for pivotable movement about a steering axis lying in a plane of general symmetry. The system according to the invention includes an adjustable pin for limiting pivotable movement of the front steering assembly about the steering axis to a predetermined angle when the pin is adjusted to an active position. The adjustable pin is selectively movable to an inactive position for effecting pivotable movement of the front steering assembly beyond the predetermined angle.

15 Claims, 4 Drawing Sheets

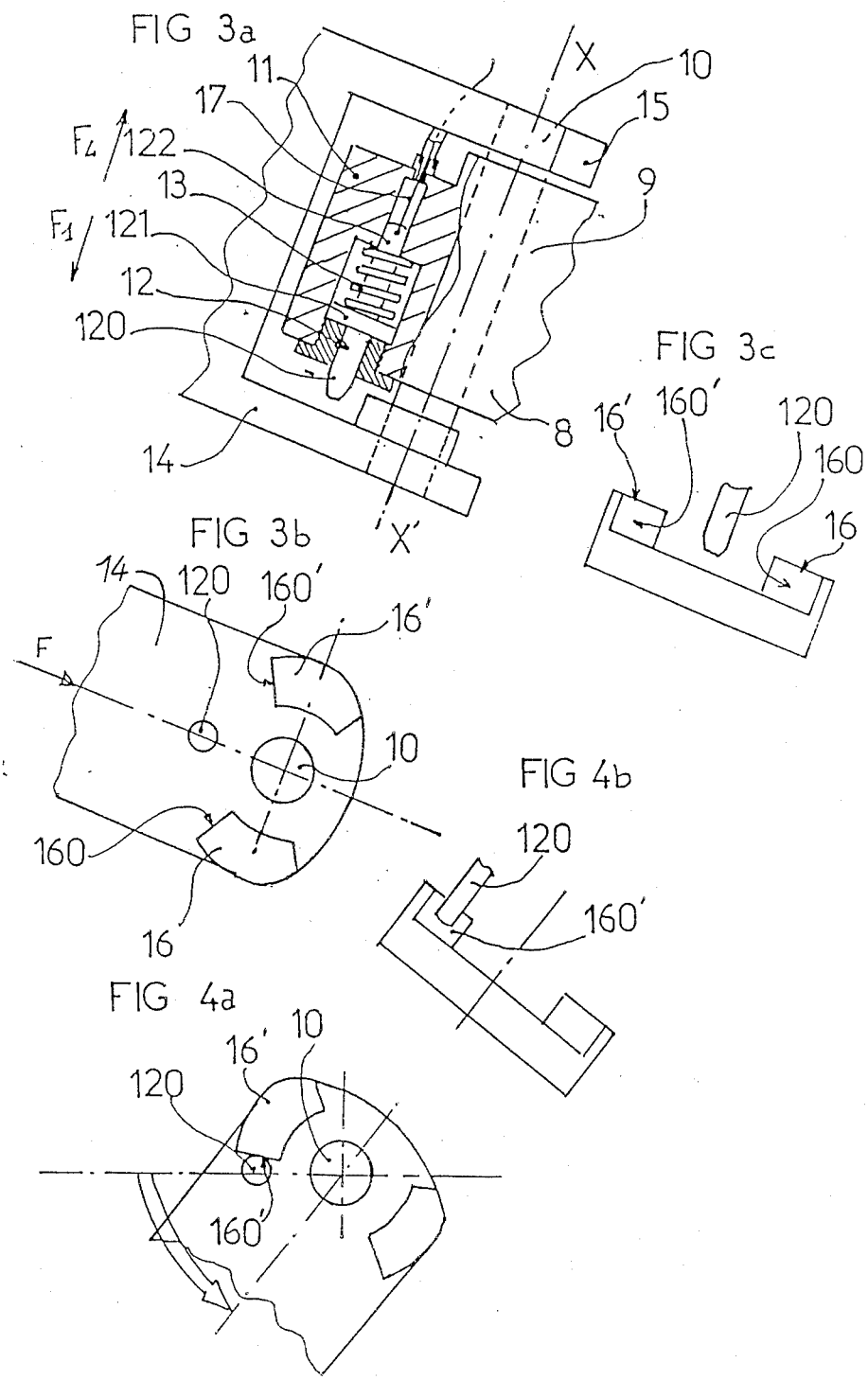

STEERING SYSTEM FOR VEHICLE SUCH AS SNOWMOBILE

DESCRIPTION

1. Technical Field

The present invention relates to a steering system for a vehicle such as a snowmobile.

2. Background Art

Vehicles especially designed to travel on snow or ice are well known. Examples of such vehicles are found in French Patent Application Nos. 85 13288 and 85 13289. In these vehicles, as well as in others presently on the market, the steering column is free to pivot about the steering axis through an angle of about 90° to each side of a vertical plane of general symmetry through the vehicle. The ability of the steering column to pivot through such a large angle is disadvantageous because, as all drivers of such vehicles know, a large and sudden change in steering direction may cause the vehicle to forwardly tip over on itself. For this reason, limitations on the degree of pivotable movement of the front steering column are built into snowmobiles.

The limitation on pivoting is achieved by an abutment system such that the steering column cannot be pivoted beyond an angle of about 60° to each side of the longitudinal vertical plane of the vehicle that contains the steering axis. In certain cases, however, the ability to exceed this limit is desireable. In the snowmobile described in French Application No. 85 13290, for example, a stable parking position for the vehicle is achieved by permitting the steering column to pivot to an angle of 90°.

An object of the present invention is to provide a new and improved steering system for a vehicle such as a snowmobile, which overcomes the disadvantages of the prior art as set forth above.

BRIEF DESCRIPTION OF THE INVENTION

The present invention provides a steering system for a vehicle having a rear carrier assembly that includes ground engaging means, a front steering assembly that includes ground engaging means, and mounting means mounting the front steering assembly on the rear carrier assembly for pivotable movement about a steering axis lying in a plane of general symmetry of the vehicle. According to the present invention, adjustable means are provided for limiting pivotable movement of the front steering assembly about the steering axis to a predetermined angle when the adjustment means is adjusted to an active position. The adjustment means are selectively adjustable to an inactive position for effecting pivotal movement of the front steering assembly beyond the predetermined angle. When the adjustable means is adjusted to its active position, the vehicle may be operated safely while travelling forwardly. When the vehicle is to be parked, however, the adjustable means can be moved to its inactive position permitting the front steering assembly to move beyond the predetermined angle which defines the limits of the front steering assembly during the motion of the vehicle.

In the preferred embodiment of the invention, the adjustable means are in the form of a pin mounted on one of the assemblies and a pair of spaced abutments mounted on the other assembly. In such case, the finger is movable between an active position at which the finger is engageable by the abutments when the front steering assembly is pivoted through its predetermined angle, and an inactive position in which the finger clears the abutments allowing the front steering assembly to pivot beyond its predetermined angle.

In one embodiment of the invention, the pin is mounted on the front steering assembly and the abutments are on the rear carrier assembly. In a second embodiment of the invention, the pin is mounted on the rear carrier assembly and the abutments are on the front steering assembly. In both cases, bias means, such as a spring, resiliently urge the pin towards its active position. Operator means, including a flexible cable, may be connected to the pin for selectively overcoming the bias of the spring. The abutments may contain receiving means for receiving the pin after the front steering assembly is pivoted beyond its predetermined angular position, for example, to a 90° position, thereby locking the steering assembly against pivotable movement when the vehicle is parked.

BRIEF DESCRIPTION OF DRAWINGS

Embodiments of the present invention are shown in the accompanied drawings wherein:

FIG. 3a is a side view, partially in section, of the first embodiment of the invention taken along the line III—III in FIG. 2 showing the first embodiment of the present invention and showing the pin in its active position;

FIG. 3b is a plan view of the pin/abutment configuration of the first embodiment;

FIG. 3c is a front view taken in the direction of the arrow F of FIG. 3b;

FIG. 4a is a view similar to the view shown in FIG. 3b, except showing the front steering assembly pivoted to a stop position for limiting pivotable movement of the steering assembly in one direction about steering axis X, X' shown in FIG. 3a.;

FIG. 4b is a front view of the apparatus shown in FIG. 4a;

DETAILED DESCRIPTION

Figure 1:
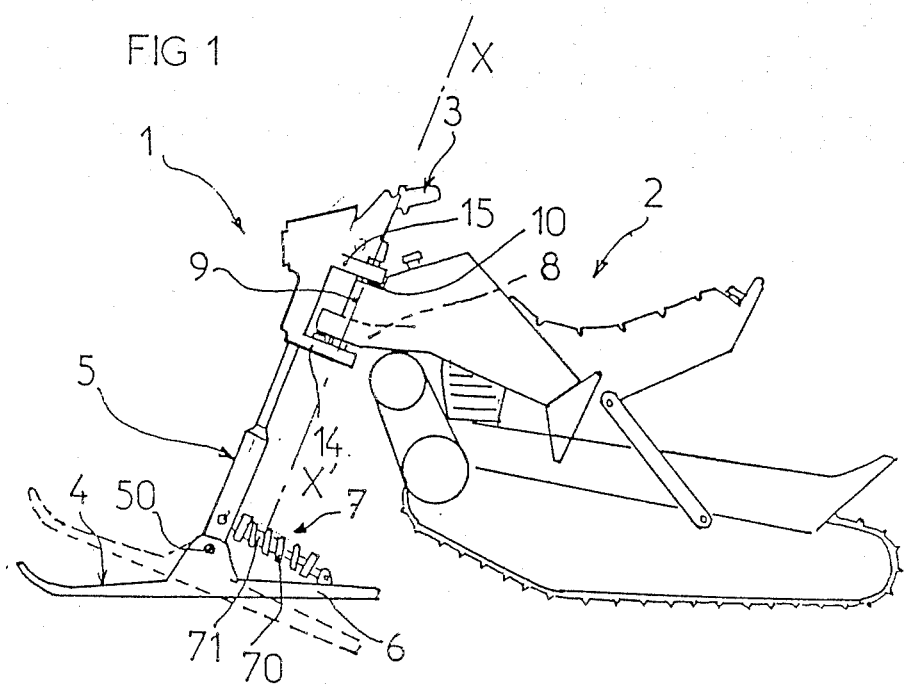
FIG. 1 is a side view of vehicle into which the present invention is incorporated.
Figure 2:
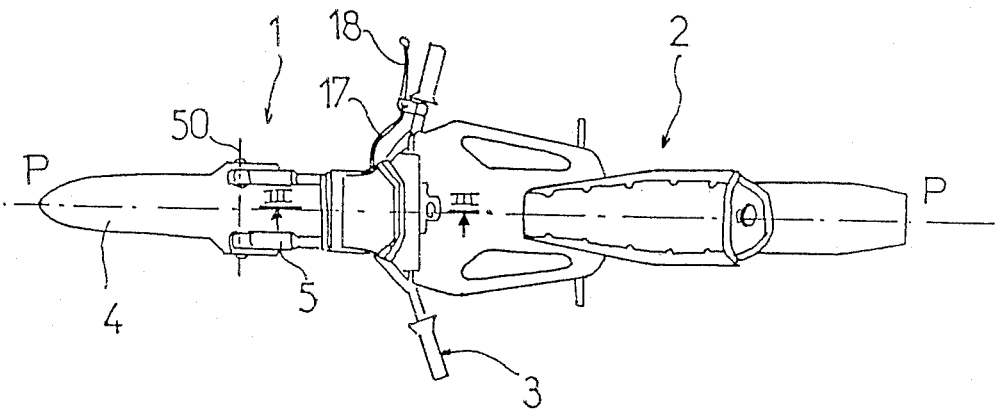
FIG. 2 is a top view of the vehicle shown in FIG. 1.

Referring now to the drawings, FIGS. 1 and 2 illustrate a snowmobile equipped with a system according to the present invention. The snowmobile is constituted by two assemblies; rear carrier assembly 2 carrying ground engaging means, and front steering assembly 1 comprising steering column 5 having handle bars 3 at one end, and ground engaging means at the other end in the form of ski runner 4. Front steering assembly 1 also includes a pair of spaced plates 14 and 15 for receiving casing 9 on chassis 8 of rear carrier assembly 2.

Front steering assembly 1 is mounted by pivot 10 on rear carrier assembly 2 for pivotal movement around axis X, X' positioned in the vertical longitudinal plane of general symmetry P (FIG. 2) of the vehicle. Axis X, X' is slightly inclined towards the rear as shown in FIG. 1. The axis of steering column 5 is parallel to but spaced from axis X, X'. Ski 4 is mounted on steering column 5 for pivotable movement about axis 50 that is transverse to steering column 5. Preferably, rear portion 6 of the ski is connected to the lower portion of the front steering assembly by suspension system 7 constituted by spring 70 and shock absorber 71. The suspension system is such that is urges ski 4 into a position perpendicular to the steering column as shown by the broken lines in FIG. 1.

As shown best in FIG. 3a, projection 11 is integral with casing 9, and is located forwardly of pivot 10, which defines axis X, X', between upper plate 15 and lower plate 14. Pin 12 is slidably mounted in an aperture in projection 11, the axis of this aperture being parallel to the axis of pivot 10. Spring 13 bearing against a shoulder in an enlarged opening in projection 11 engages collar 121 fixed to the pin and resiliently urges the pin towards its active position shown in FIG. 3a in the direction of arrow F1. In such active position, the free end 120 of pin 12 is positioned to engage spaced abutments 16, 16' fixed to lower plate 14 as shown in FIG. 3b. Pin 12 and abutments 16, 16' constitute an abutment system for limiting pivotal movement of the first steering assembly. That is to say, free end 120 of pin 12 is such that it projects into the zones swept by pivotable movement of the front steering assembly and engages abutments 16 and 16' as shown in FIGS. 4a and 4b.

In normal operation, i.e., while the vehicle is travelling forwardly, the engagement of end 120 of pin 12 with abutment 16 and 16' limits pivoting of the front steering assembly to about 60° to each side of plane P.

Figure 5A:
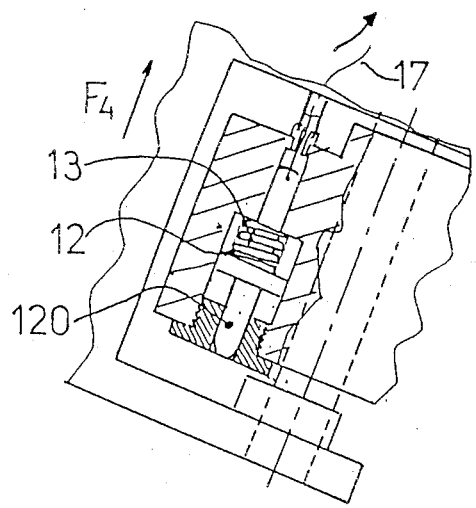
FIGS. 5a and 5b are views similar to FIGS. 3a and 3b showing the pin in its inactive position.
Figure 5B:
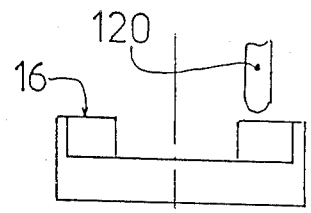

In order to selectively move pin 12 from its active position as shown in FIG. 3a to its retracted position shown in FIG. 5a, traction cable 17 is affixed to the end of the pin remote from end 120. This traction cable is connected to actuating handle 18 (FIG. 2) located on handle bars 3 preferably on the right side and in front of the usual front brake handle. Actuation lever 18 has the effect of pulling cable 17 in the direction of arrow F4, and retracting pin 12 against the bias of spring 13 from the active position shown in FIG. 3a to the inactive position shown in FIG. 5a. When pin 12 is in its inactive position, front steering assembly 1 can pivot beyond the 60° limit imposed by abutments 16, 16'. Thus, the front steering assembly can be pivoted about 90° to a position substantially perpendicular to plane P as shown in FIG. 6b.

Figure 6A:
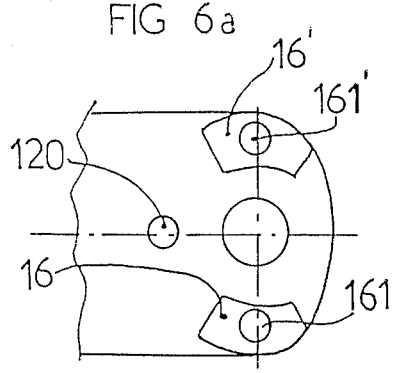
FIGS. 6a-6c are schematic views showing how the steering assembly can be locked at a 90° angle to the axis of symmetry.
Figure 6C:
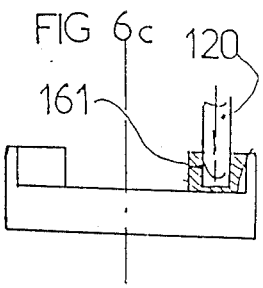
Figure 6B:
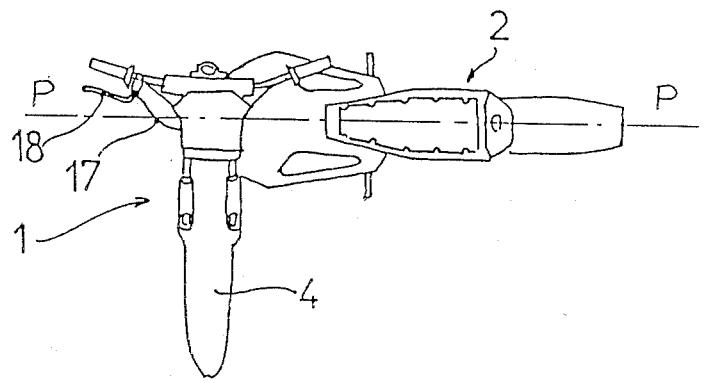

In order to releasably retain the front steering assembly in the position shown in FIG. 6b, a releasable locking system is provided. This is illustrated in FIGS. 6a and 6c by receiver holes 161 located in the top surface of abutments 16. Each receiver hole is dimensioned to receive free end 120 of pin 12. When pin 12 is moved to its inactive position, and front steering assembly is turned to the position shown in FIG. 6b, deactivation of handle 18 will cause spring 13 to extend the pin to its action position into seating relationship with receiver hole 161 provided the pin is aligned with a receiver hole. As shown in FIG. 6a, a similar receiver hole can be provided in the other abutment to permit the front steering assembly to be turned and releasably held at 90° on either side of plane P.

Figure 7:
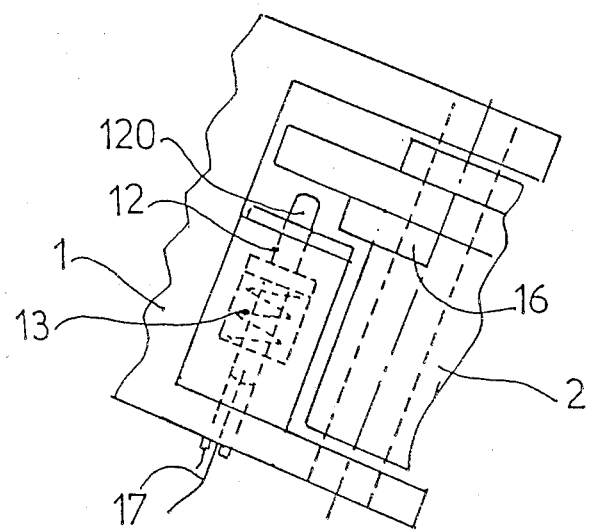
FIG. 7 is a view similar to FIG. 5a but showing a second embodiment of the present invention.

In the embodiment described above, the abutment system is constituted by pin 12 mounted on rear carrier assembly 2 and by abutments 16, 16' carried by front steering assembly 1. In the second embodiment, the pin is mounted on the front steering assembly and the abutments are mounted on the rear carrier assembly. This second embodiment is illustrated in FIG. 7.

In a further modification, pin 12 could be fixed while the abutments could be moveable into active and inactive positions relative to the pin. In a further modification, positioning the abutments to limit pivotal movement of the front steering assembly to an angle other than 60° is also possible without detracting from the spirit of the invention.

The advantages and improved results furnished by the method and apparatus of the present invention are apparent from the above description of the preferred embodiments of the invention. Various changes and modifications may be made without departing from the spirit and scope of the invention described in the claims that follow.

What is claimed is:

1. A steering system for a vehicle having a rear carrier assembly that includes ground engaging means, a front steering assembly that includes ground engaging means, and mounting means mounting said front steering assembly on said rear carrier assembly for pivotal movement about a steering axis lying in a plane of general symmetry of the vehicle, said system comprising:
   (a) adjustable means for limiting pivotal movement of said front steering assembly about said axis to a predetermined angle greater than zero degrees when said adjustment means is adjusted to an active position; and
   (b) said adjustable means being selectively adjustable to an inactive position for effecting pivotal movement of said front steering assembly beyond said predetermined angle.

2. A steering system according to claim 1 wherein said adjustable means includes:
   (a) a pin mounted on one assembly and a pair of spaced abutments mounted on the other assembly; and
   (b) said pin being moveable between an active position at which said pin is engageable by said abutments when said front steering assembly is pivoted through said predetermined angle, and an inactive position at which pin clears said abutments when said front steering assembly is pivoted beyond said predetermined angle.

3. A steering system according to claim 2 including bias means for resiliently biasing said pin toward its active position.

4. A steering assembly according to claim 3 including operator means connected to said pin and selectively operable to overcome the bias of said bias means.

5. A steering assembly according to claim 4 wherein said operator means is mounted on said front steering assembly.

6. A steering system according to claim 4 including receiver means in at least one of said abutments for receiving said pin after said front steering assembly has pivoted beyond said predetermined angle and said finger has moved from its inactive position to its active position for releasably locking said front steering assembly against rotation relative to said carrier assembly.

7. A steering system according to claim 2 wherein said pin is on said front steering assembly, and said abutments are on said rear carrier assembly.

8. A steering system according to claim 7 wherein said rear carrier assembly includes a projection containing an aperture whose axis is parallel to said steering axis, said pin being slidably mounted in said aperture, and said abutments on said rear carrier assembly constituting lateral projections thereon.

9. A steering system according to claim 8 wherein the axis of said aperture is parallel to said steering axis.

10. A steering system according to claim 9 wherein said operator means is in the form of a flexible cable that terminates in a pivotal lever mounted on said front steering assembly and adapted to be selectively pivoted by an operator.

11. A steering system according to claim 2 wherein said pin is on said rear carrier assembly and said abutments are on said front steering assembly.

12. A steering system according to claim 11 wherein said front carrier assembly includes a projection containing an aperture whose axis is parallel to said steering axis, said pin being slidable in said aperture, and said abutments are on said front steering assembly and are lateral projections thereon.

13. A steering assembly according to claim 12 wherein the axis of said aperture lies in the plane of general symmetry.

14. A vehicle comprising:
(a) a rear carrier assembly that includes ground engaging means;
(b) a front steering assembly having a steering column with handle bars at one end and ground engaging means at the other end, and a pair of spaced plates intermediate the handle bars and the ground engaging means;
(c) mounting means engaged with said plates for mounting said front steering assembly on said rear carrier assembly for pivotal movement about a steering axis lying in a plane of general symmetry;
(d) a pin slidably mounted on one assembly for translation along an axis that is parallel to said steering axis between and active position and an inactive position;
(e) a pair of projections mounted on the other assembly and engagable by said pin when in its active position for limiting pivotal movement of said front steering assembly mounted about said steering axis to a predetermined angle;
(f) means for biasing said pin toward its active position; and
(g) a cable connecting said pin to a handle pivotably mounted on said handle bars for selectively moving said pin to its inactive position when said handle is pivoted.

15. A vehicle according to claim 14 wherein the ground engaging means on said front steering assembly comprises:
(a) a ski runner pivotably mounted on said front steering assembly about an axis transverse to the steering column; and
(b) a suspension wing connecting the rear end of the ski to said steering column, said link being constructed and arranged to resiliently urge the ski to a position perpendicular to the steering axis.

* * * * *